US010085274B2

(12) United States Patent
Shi et al.

(10) Patent No.: US 10,085,274 B2
(45) Date of Patent: Sep. 25, 2018

(54) APPARATUS AND METHOD OF IMPROVING VOLTE/VT CALL SETUP SUCCESSFUL RATE IN A DSDS DEVICE

(71) Applicant: QUALCOMM Incorporated, San Diego, CA (US)

(72) Inventors: Yongsheng Shi, San Diego, CA (US); Suli Zhao, San Diego, CA (US); Mona Agrawal, San Diego, CA (US); Qingxin Chen, San Diego, CA (US); Reza Shahidi, San Diego, CA (US); Uttam Pattanayak, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 163 days.

(21) Appl. No.: 15/333,554

(22) Filed: Oct. 25, 2016

(65) Prior Publication Data

US 2018/0115978 A1 Apr. 26, 2018

(51) Int. Cl.
*H04W 72/10* (2009.01)
*H04W 88/00* (2009.01)
(Continued)

(52) U.S. Cl.
CPC .......... *H04W 72/10* (2013.01); *H04W 8/183* (2013.01); *H04W 48/18* (2013.01); *H04W 88/005* (2013.01); *H04W 68/12* (2013.01); *H04W 76/16* (2018.02); *H04W 84/105* (2013.01); *H04W 84/12* (2013.01); *H04W 88/06* (2013.01)

(58) Field of Classification Search
CPC ..... H04W 72/10; H04W 8/183; H04W 48/18; H04W 68/005; H04W 84/105; H04W 84/12; H04W 88/06; H04W 68/12; H04W 76/16
See application file for complete search history.

(56) References Cited

U.S. PATENT DOCUMENTS

2015/0094071 A1 4/2015 Hang et al.
2016/0095157 A1 3/2016 Wenzel et al.
(Continued)

FOREIGN PATENT DOCUMENTS

WO 2016148617 A1 9/2016

OTHER PUBLICATIONS

International Search Report and Written Opinion—PCT/US2017/050484—ISA/EPO—dated Dec. 15, 2017.

*Primary Examiner* — Ian N Moore
*Assistant Examiner* — Brian T Le
(74) *Attorney, Agent, or Firm* — Procopio, Cory, Hargreaves & Savitch LLP

(57) ABSTRACT

A method for call setup for a voice-over-long-term evolution (VoLTE) call on multi-subscriber identity module (SIM) multi-standby (MSMS) mobile communication device includes: receiving a long-term evolution (LTE) page; determining whether a WiFi connection is available; in response to determining that the WiFi connection is not available, determining whether the LTE page was received on a non-dedicated data subscription (DDS) subscription; and in response to determining that the LTE page was received on the non-DDS subscription, granting a highest priority for communication activities to an LTE page response on the non-DDS subscription.

30 Claims, 4 Drawing Sheets

(51) Int. Cl.
*H04W 48/18* (2009.01)
*H04W 8/18* (2009.01)
H04W 84/12 (2009.01)
H04W 84/10 (2009.01)
H04W 88/06 (2009.01)
H04W 68/12 (2009.01)
H04W 76/16 (2018.01)

(56) References Cited

U.S. PATENT DOCUMENTS

| | | |
|---|---|---|
| 2016/0142998 A1 | 5/2016 | Tsai et al. |
| 2016/0219421 A1 | 7/2016 | Shi et al. |
| 2016/0226923 A1 | 8/2016 | Purkop et al. |
| 2016/0381618 A1* | 12/2016 | Sayem .................. H01Q 1/243 370/329 |

* cited by examiner

US 10,085,274 B2

APPARATUS AND METHOD OF IMPROVING VOLTE/VT CALL SETUP SUCCESSFUL RATE IN A DSDS DEVICE

BACKGROUND

When a Long Term Evolution (LTE) page is received by a dual-sim-dual-standby (DSDS) mobile communication device supporting Voice over LTE/Video Telephony (VoLTE/VT) service, the mobile communication device may not understand whether the page is for a normal packet switched (PS) call or for a VoLTE/VT call. Therefore, the mobile communication device cannot prioritize the page response. Accordingly, the page response could be delayed and result in VoLTE/VT call setup failure.

As an example, a first LTE subscription (Sub1) may receive a PS page for a VoLTE call. However, the mobile communication device may not know the purpose of the page (i.e., for a PS call or for a VoLTE/VT call). At the same time, a second LTE subscription (Sub2) may be attempting to establish a PS call and may be controlling the transceiver resources. Therefore, Sub1 may need to wait for the Sub2 call establishment procedure to complete before responding to the (VoLTE) page. As a result of the delay, VoLTE call setup may fail. Alternatively, Sub1 may preempt the Sub2 activity to respond to the page. However, it is unnecessary to always permit the mobile communication device to preempt an activity on one subscription to receive an LTE page on the other subscription, for example when the page is for a normal PS call, since PS call setup can generally tolerate longer delay.

As another example, a first LTE subscription (Sub1) may receive a PS page which is actually for a PS call. However, the mobile communication device may not know the purpose of the page (i.e., for a PS call or for a VoLTE/VT call). At the same time, a second LTE subscription (Sub2) may be performing circuit switched (CS) (i.e., voice call) registration by sending a location area update (LAU) to the network. If Sub1 is given higher priority than Sub2 to respond to the page, Sub1 acquires control of the transceiver resources which may cause CS registration for Sub2 to fail, effectively blocking the voice call on Sub2.

SUMMARY

Apparatuses and methods for improving VoLTE/VT call setup success rate in a DSDS mobile communication device are provided.

According to various aspects there is provided a method for call setup for a voice-over-long-term evolution (VoLTE) call on multi-subscriber identity module (SIM) multi-standby (MSMS) mobile communication device. In some aspects, the method may include: receiving a long-term evolution (LTE) page; determining whether a WiFi connection is available; in response to determining that the WiFi connection is not available, determining whether the LTE page was received on a non-dedicated data subscription (DDS) subscription; and in response to determining that the LTE page was received on the non-DDS subscription, granting a highest priority for communication activities to an LTE page response on the non-DDS subscription.

According to various aspects there is provided a multi-subscriber identity module (SIM) multi-standby (MSMS) mobile communication device. In some aspects, the MSMS mobile communication device may include: a cellular communication unit configured to communicate with one or more communication networks; a WiFi communication unit configured to communicate with one or more WiFi networks; a control unit operably connected to the cellular communication unit and the WiFi communication unit.

The control unit may be configured to: control the cellular communication unit to receive a long-term evolution (LTE) page; control the WiFi communication unit to determine whether a WiFi connection is available; in response to determining that the WiFi connection is not available, determine whether the LTE page was received on a non-dedicated data subscription (DDS) subscription; and in response to determining that the LTE page was received on the non-DDS subscription, control the cellular communication unit to grant a highest priority for communication activities to an LTE page response on the non-DDS subscription.

According to various aspects there is provided a non-transitory computer readable medium. In some aspects, the non-transitory computer readable medium may include instructions for causing one or more processors to perform a method for voice-over-long-term evolution (VoLTE) call setup on multi-subscriber identity module (SIM) multi-standby (MSMS) mobile communication device, the instructions including: receiving a long-term evolution (LTE) page; determining whether a WiFi connection is available; in response to determining that the WiFi connection is not available, determining whether the LTE page was received on a non-dedicated data subscription (DDS) subscription; and in response to determining that the LTE page was received on the non-DDS subscription, granting a highest priority for communication activities to an LTE page response on the non-DDS subscription.

According to various aspects there is provided a multi-subscriber identity module (SIM) multi-standby (MSMS) mobile communication device. In some aspects, the MSMS mobile communication device may include: means for receiving a long-term evolution (LTE) page; means for determining whether a WiFi connection is available; in response to determining that the WiFi connection is not available, means for determining whether the LTE page was received on a non-dedicated data subscription (DDS) subscription; and in response to determining that the LTE page was received on the non-DDS subscription, means for granting a highest priority for communication activities to an LTE page response on the non-DDS subscription.

Other features and advantages should be apparent from the following description which illustrates by way of example aspects of the various teachings of the disclosure.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
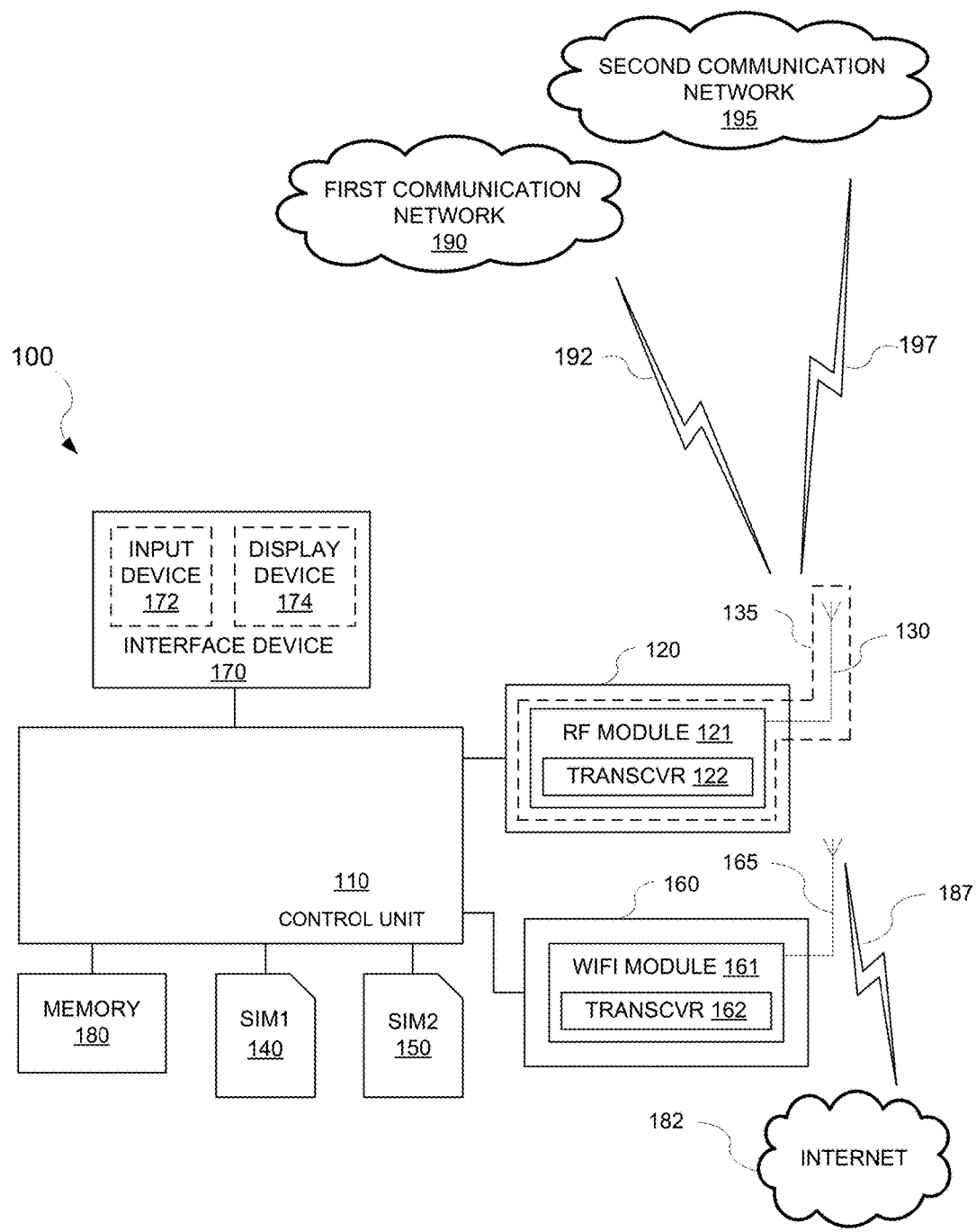
FIG. 1A is a block diagram illustrating a mobile communication device in accordance with certain aspects of the present disclosure.

FIG. 1A is a block diagram illustrating a mobile communication device 100 in accordance with certain aspects of the present disclosure. As illustrated in FIG. 1A, the mobile communication device 100 may include a control unit 110, a cellular communication unit 120, a first antenna 130, a first subscriber identity module (SIM) 140, a second SIM 150, a user interface device 170, a WiFi communication unit 160, a second antenna 165, and a memory 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more communication units and may interface with one or more antennas without departing from the scope of protection.

The cellular communication unit 120 may include, for example, but not limited to, a radio frequency (RF) module 121. The RF module 121 may include, for example, but not limited to a cellular transceiver 122. An RF chain 135 may include, for example, but not limited to the first antenna 130 and the RF module 121.

One of ordinary skill in the art will appreciate that embodiments of the mobile communication device 100 may include more than one cellular communication unit and/or more than one first antenna without departing from the scope of protection.

A SIM (for example the first SIM 140 and/or the second SIM 150) in various embodiments may be a universal integrated circuit card (UICC) that is configured with SIM and/or universal SIM (USIM) applications, enabling access to global system for mobile communications (GSM) and/or universal mobile telecommunications system (UMTS) networks. The UICC may also provide storage for a phone book and other applications. Alternatively, in a code division multiple access (CDMA) network, a SIM may be a UICC removable user identity module (RUIM) or a CDMA subscriber identity module (CSIM) on a card. A SIM card may have a CPU, ROM, RAM, EEPROM and I/O circuits. An integrated circuit card identity (ICCID) SIM serial number may be printed on the SIM card for identification. However, a SIM may be implemented within a portion of memory of the mobile communication device 100, and thus need not be a separate or removable circuit, chip, or card.

A SIM used in various embodiments may store user account information, an international mobile subscriber identity (IMSI), a set of SIM application toolkit (SAT) commands, and other network provisioning information, as well as provide storage space for phone book database of the user's contacts. As part of the network provisioning information, a SIM may store home identifiers (e.g., a system identification number (SID)/network identification number (NID) pair, a home public land mobile network (HPLMN) code, etc.) to indicate the SIM card network operator provider.

The first SIM 140 may associate the cellular communication unit 120 with a first subscription (Sub1) 192 associated with a first radio access technology (RAT) on a first communication network 190 and the second SIM 150 may associate the cellular communication unit 120 with a second subscription (Sub2) 197 associated with a second RAT on a second communication network 195. When a RAT is active, the cellular communication unit 120 receives and transmits signals on the active RAT. When a RAT is idle, the cellular communication unit 120 receives but does not transmit signals on the idle RAT.

For convenience, the various embodiments are described in terms of DSDS mobile communication devices. However, one of ordinary skill in the art will appreciate that the various embodiments may be extended to Multi-SIM Multi-Standby (MSMS) and/or Multi-SIM Multi-Active (MSMA) mobile communication devices without departing from the scope of protection.

The first communication network 190 and the second communication network 195 may be operated by the same or different service providers, and/or may support the same or different RATs, for example, but not limited to, GSM, CDMA, wideband CDMA (WCDMA), and long term evolution (LTE).

The WiFi communication unit 160 may include, for example, but not limited to, a WiFi module 161 and a second antenna 165. The WiFi module 161 may include, for example, but not limited to a WiFi transceiver 162. The WiFi communication unit 160 may communicate with the Internet through a wireless network, for example, via a wireless router or access point.

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the various embodiments.

The control unit 110 may be configured to control overall operation of the mobile communication device 100 including control of the cellular communication unit 120, the WiFi communication unit 160, the user interface device 170, and the memory 180. The control unit 110 may be a programmable device, for example, but not limited to, a microprocessor (e.g., general-purpose processor, baseband modem processor, etc.) or microcontroller.

The memory 180 may be configured to store operating systems and/or application programs for operation of the mobile communication device 100 that are executed by the control unit 110, as well as to store application data and user data.

Figure 1B:
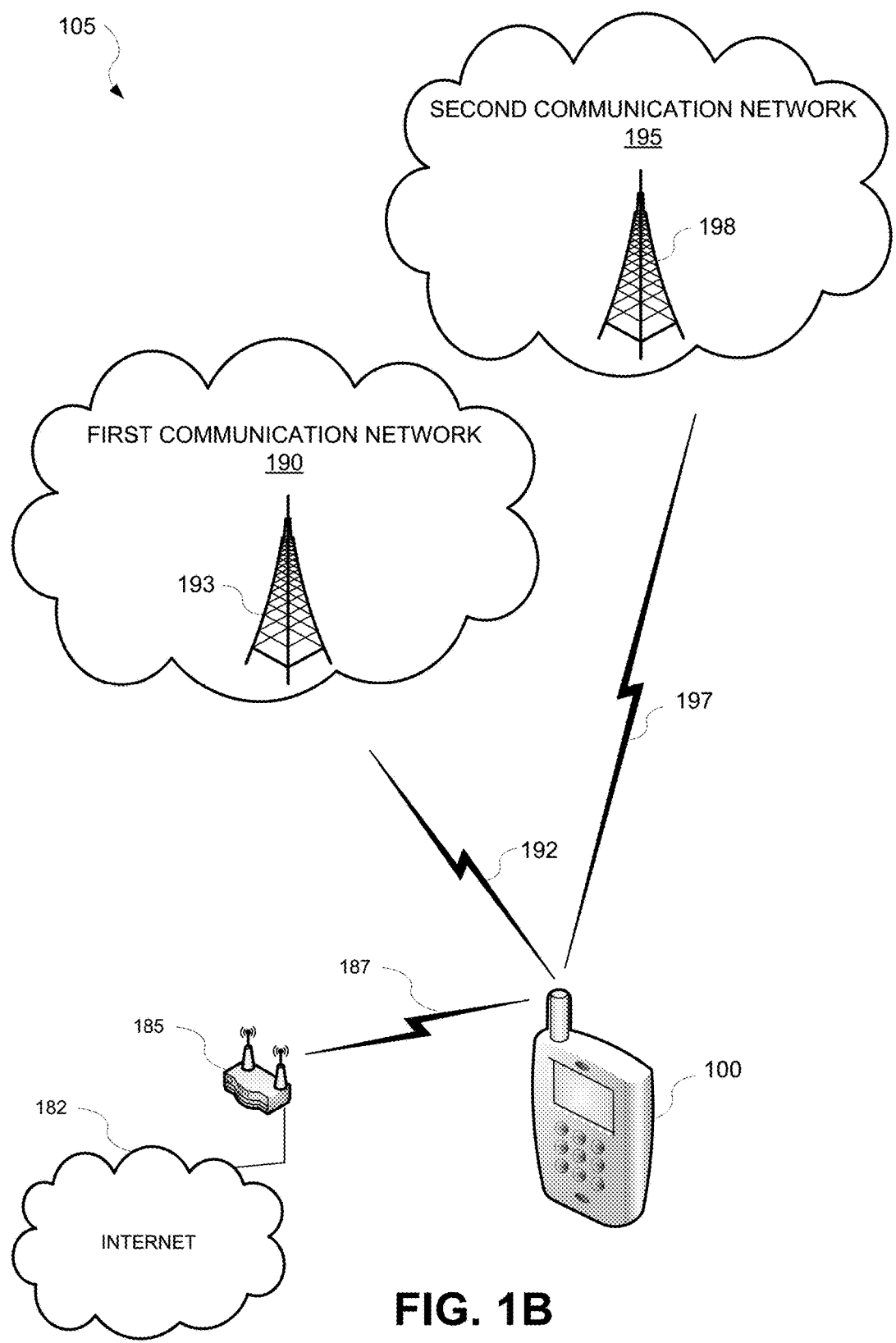
FIG. 1B is a diagram illustrating a network environment in accordance with certain aspects of the present disclosure.

FIG. 1B is a diagram illustrating a network environment 105 in accordance with certain aspects of the present disclosure. Referring to FIGS. 1A and 1B, a mobile communication device 100 may be configured to communicate with a first communication network 190 on a first subscription 192 and a second communication network 195 on a second subscription 197. One of ordinary skill in the art will appreciate that the mobile communication device may configured to communicate with more than two communication networks and may communicate on more than two subscriptions without departing from the scope of protection.

The first communication network 190 and the second communication network 195 may implement the same or different radio access technologies (RATs). For example, the first communication network 190 may be an LTE network and the first subscription 192 may be an LTE subscription. The second communication network 195 may also be an LTE network. Alternatively, the second communication network 195 may implement another RAT including, for example, but not limited to, Global System for Mobile communications (GSM), Wideband Code Division Multiple Access (WCDMA), and Time Division-Synchronous Code Division Multiple Access (TD-SCDMA).

The first communication network 190 may include one or more base transceiver stations (BTSs) including, for example, but not limited to, a first BTS 193. The second communication network 195 may also include one or more BTSs, including, for example, but not limited to, a second BTS 198. A person having ordinary skill in the art will appreciate that the network environment 105 may include any number of communication networks, mobile communication devices, and BTSs without departing from the scope of the various embodiments.

The mobile communication device 100 may attempt to acquire the first communication network 190 and camp on the first BTS 193. The mobile communication device 100 may also attempt to acquire the second communication network 195 and camp on the second BTS 198. A person having ordinary skill in the art will appreciate that the acquisition of the first communication network 190 performed on the first subscription 192 may be independent of the acquisition of the second communication network 195 performed on the second subscription 197. Furthermore, the mobile communication device 100 may attempt to acquire the first communication network 190 on the first subscription 192 and the second communication network 195 on the second subscription 197. The mobile communication device 100 may also be configured to communicate wirelessly with the Internet 182 using the WiFi communication unit 160 via a wireless connection 187 to a wireless router or access point 185.

Figure 2:
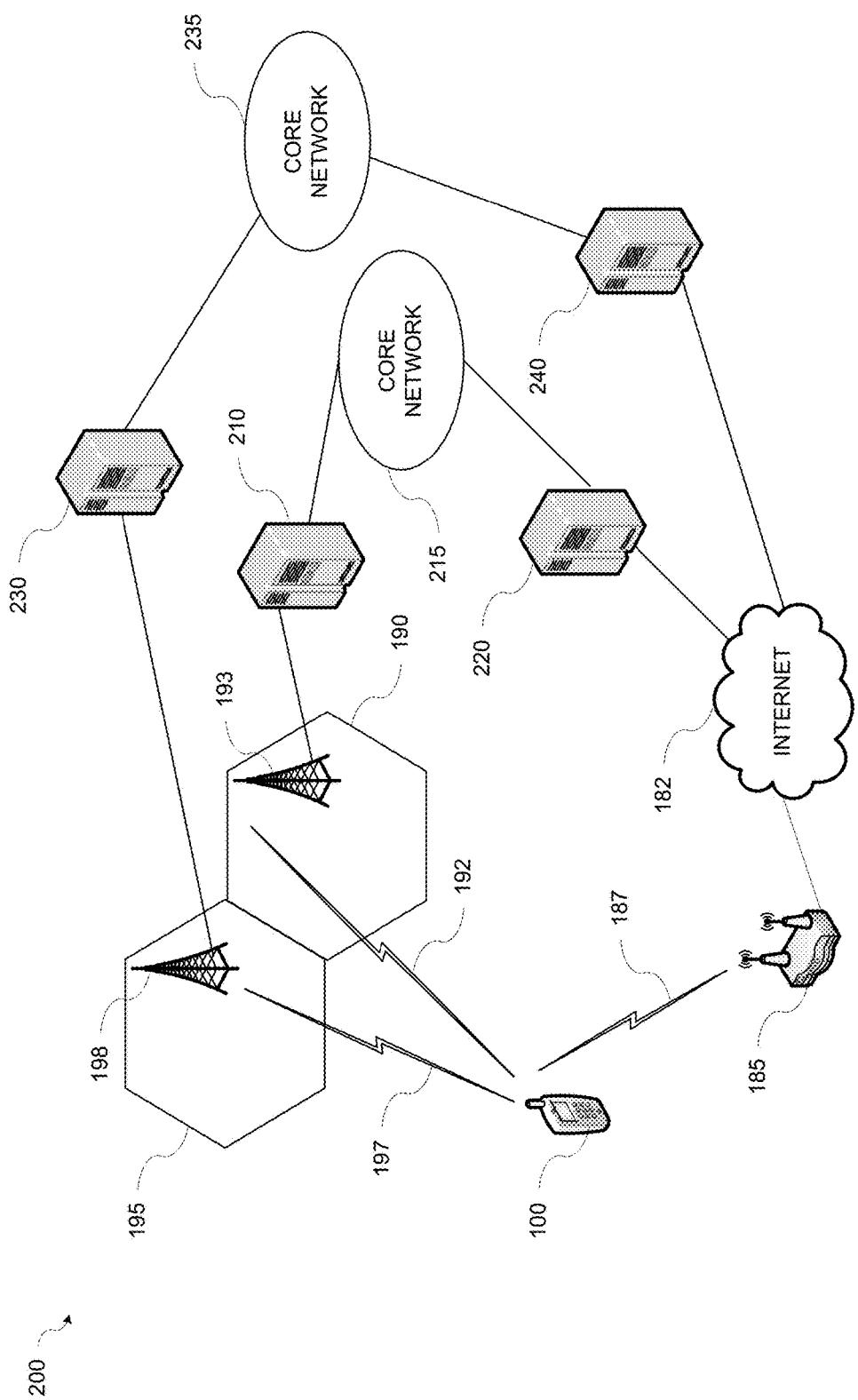
FIG. 2 is a simplified network diagram illustrating a network configuration in accordance with certain aspects of the present disclosure.

FIG. 2 is a simplified network diagram illustrating a network configuration 200 in accordance with certain aspects of the present disclosure. Referring to FIGS. 1A, 1B, and 2, the mobile communication device 100 may communicate with a first core network 215 of the first communication network 190 through, for example, but not limited to, a first base station controller (BSC) 210. The mobile communication device 100 may communicate with a second core network 235 of the second communication network 195 through, for example, but not limited to, a second base station controller (BSC) 230.

Further, the mobile communication device 100 may communicate with the first core network 215 through the Internet 182 via a wireless link 187 to a router or access point 185 and a first network controller 220. The mobile communication device 100 may also communicate with the second core network 235 through the Internet 182 via the wireless link 187 to the router or access point 185 and a second network controller 240.

One of ordinary skill in the art will appreciate that while certain elements of the networks are illustrated and discussed, the networks may include additional elements not disclosed or discussed without departing from the scope of the present disclosure.

Certain aspects of the disclosure provide apparatuses and methods for improving VoLTE/VT call setup success rate in a DSDS mobile communication device by adjusting the LTE page response priority for different scenarios.

An LTE page may be received by a DSDS mobile communication device (e.g., the mobile communication device 100) supporting VoLTE/VT service. The page may be for a normal PS call or for a VoLTE/VT call. In order to prioritize the page response the mobile communication device 100 should determine whether the LTE page is for a PS call or a VoLTE/VT call.

For a DSDS mobile communication device (e.g., the mobile communication device 100) having two subscriptions, at least one subscription may be an LTE subscription. The LTE subscription may be designated as the DDS subscription or the non-DDS subscription. When the LTE subscription is designated as the non-DDS subscription and an LTE page is received by the mobile communication device 100, a response to the LTE page on the non-DDS subscription may be granted the highest priority for the communication activities on the two subscriptions.

When the LTE subscription is designated as the non-DDS subscription, PS calls should not be received on the LTE subscription; therefore any received LTE page is more likely to be a VoLTE or VT page (i.e., a page for a voice call). A PS call on the other subscription (i.e., the DDS subscription) may be more tolerant of delay. Accordingly, the non-DDS subscription may gain control of the cellular resources (i.e., the cellular communication unit 120, the RF module 121, the cellular transceiver 122, etc.) and may preempt communication activities on the DDS subscription to respond to the LTE page.

In various aspects, the mobile communication device 100 may be capable of WiFi communication (e.g., via the WiFi communication unit 160). When the mobile communication device 100 is capable of WiFi communication, voice calls may be received over the Internet using VoWiFi. When VoWiFi is selected as the voice call option a voice call is more likely to be received over the WiFi connection. Since a voice call is more likely to be received over the Wi-Fi connection, an LTE page on the LTE subscription is more likely to be for non-VoLTE/VT purposes regardless of whether the LTE subscription is designated as the DDS subscription or the non-DDS subscription. Therefore, the LTE page may not be accorded an elevated priority for communication activities on the two subscriptions.

Where the LTE subscription is designated as the DDS subscription and the mobile communication device 100 is capable of Wi-Fi communication, VoWiFi may not be selected as the voice call option. Instead, WiFi may be selected as the PS service. Since WiFi is used for Internet PS service any LTE page received on the DDS LTE subscription is likely to be a VoLTE/VT page; therefore, a received LTE page on the LTE DDS subscription is more likely to be a VoLTE or VT page and a response to the page on the DDS subscription may be granted the highest priority of the activities on the two subscriptions. Accordingly, the LTE DDS subscription may gain control of the cellular resources (i.e., the cellular communication unit 120, the RF module 121, the cellular transceiver 122, etc.) and may preempt communication activities on the non-DDS subscription to respond to the LTE page.

Figure 3:
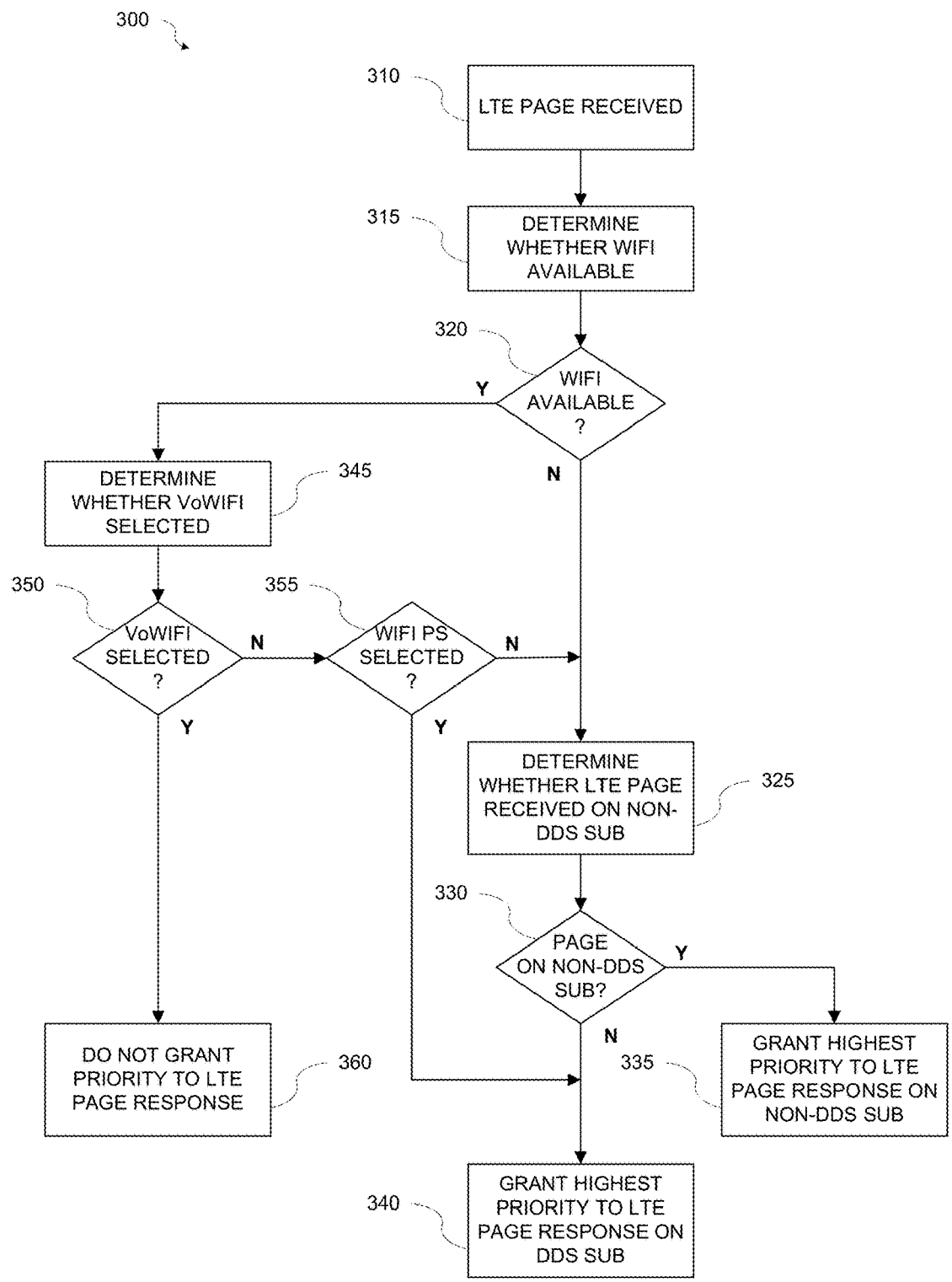
FIG. 3 is a flowchart illustrating a method for VoLTE call setup on an MSMS mobile communication device in accordance with certain aspects of the present disclosure.

FIG. 3 is a flowchart illustrating a method 300 for VoLTE call setup on an MSMS mobile communication device in accordance with certain aspects of the present disclosure. Referring to FIGS. 1A-3, at block 310, the mobile communication device 100 may receive an LTE page. For example, the control unit 110 may control the cellular communication unit 120 to receive the page on an LTE subscription from a communication network (e.g., Sub1 192 from the first communication network 190 or Sub2 197 from the second communication network 195). At block 315, the mobile communication device 100 may determine whether a WiFi connection is available. For example, the control unit 110 may control the WiFi communication unit 160 to scan for and identify available WiFi networks and may determine if any available WiFi networks have been identified.

In response to determining that no available Wi-Fi networks have been identified (320-N), at block 325 the control unit 110 may determine whether the LTE page was received on the LTE subscription designated as the non-DDS subscription (e.g., Sub1 192 or Sub2 197). When the LTE subscription is designated as the non-DDS subscription, PS calls should not be received on the LTE subscription; therefore any received LTE page is more likely to be a VoLTE or VT page (i.e., a page for a voice call).

In response to determining that the LTE page was received on the LTE subscription designated as the non-DDS subscription (330-Y), at block 335 the highest priority for communication activities on the two subscriptions may be granted to an LTE page response on the non-DDS subscription. For example, the control unit 110 may control the cellular communication unit 120 to permit the non-DDS subscription to gain control of the cellular resources (i.e., the cellular communication unit 120, the RF module 121, the cellular transceiver 122, etc.) and may preempt communication activities on the DDS subscription to respond to the LTE page.

In response to determining that the LTE page was received on the LTE subscription designated as the DDS subscription (330-N), at block 340 the highest priority may be granted to an LTE page response on the DDS subscription. For example, the control unit 110 may control the cellular communication unit 120 to permit the DDS subscription to gain control of the cellular resources (i.e., the cellular communication unit 120, the RF module 121, the cellular transceiver 122, etc.) and may preempt communication activities on the non-DDS subscription to respond to the LTE page.

On the other hand, in response to determining that available WiFi networks have been identified (320-Y), at block 345 the control unit 110 may determine whether VoWiFi is selected for receiving voice calls. For example, the control unit 110 may determine whether the WiFi communication unit 160 is configured to receive voice calls over the Internet. When the mobile communication device 100 is capable of WiFi communication, voice calls may be received over the Internet using VoWiFi. When VoWiFi is selected as the voice call option a voice call is more likely to be received over the WiFi connection.

In response to determining that the WiFi communication unit 160 is configured to receive voice calls over the Internet (i.e., VoWiFi is selected as the voice call option) (350-Y), at block 360 priority for communication activities on the two subscriptions may not be granted to an LTE page response.

In response to determining that the WiFi communication unit 160 is not configured to receive voice calls over the Internet (i.e., VoWiFi is not selected as the voice call option) (350-Y), at block 355 it may be determined whether WiFi is selected for PS service. For example, the control unit 110 may determine whether the WiFi communication unit 160 is configured to receive PS service over the Internet.

In response to determining that the WiFi communication unit 160 is configured to receive PS service over the Internet (355-Y), at block 340 the highest priority for communication activities on the two subscriptions may be granted to an LTE page response on the DDS subscription. For example, the control unit 110 may control the cellular communication unit 120 to permit the DDS subscription to gain control of the cellular resources (i.e., the cellular communication unit 120, the RF module 121, the cellular transceiver 122, etc.) and may preempt communication activities on the non-DDS subscription to respond to the LTE page. Since WiFi is used for Internet PS service any LTE page received on the DDS LTE subscription is likely to be a VoLTE/VT page; therefore, a received LTE page on the LTE DDS subscription is more likely to be a VoLTE or VT page.

In response to determining that the WiFi communication unit 160 is configured to receive PS calls over the Internet (355-N), at block 325 the control unit 110 may determine whether the LTE page was received on the LTE subscription designated as the non-DDS subscription (e.g., Sub1 192 or Sub2 197). When the LTE subscription is designated as the non-DDS subscription, PS calls should not be received on the LTE subscription; therefore any received LTE page is more likely to be a VoLTE or VT page (i.e., a page for a voice call).

In response to determining that the LTE page was received on the LTE subscription designated as the non-DDS subscription (330-Y), at block 335 the highest priority for communication activities on the two subscriptions may be granted to an LTE page response on the non-DDS subscription. For example, the control unit 110 may control the cellular communication unit 120 to permit the non-DDS subscription to gain control of the cellular resources (i.e., the cellular communication unit 120, the RF module 121, the cellular transceiver 122, etc.) and may preempt communication activities on the DDS subscription to respond to the LTE page.

At block 325 the control unit 110 may determine whether the LTE page was received on the LTE subscription designated as the non-DDS subscription (e.g., Sub1 192 or Sub2 197). In response to determining that the LTE page was received on the LTE subscription designated as the non-DDS subscription (330-Y), at block 335 the highest priority for communication activities on the two subscriptions may be granted to an LTE page response on the non-DDS subscription. For example, the control unit 110 may control the cellular communication unit 120 to permit the non-DDS subscription to gain control of the cellular resources (i.e., the cellular communication unit 120, the RF module 121, the cellular transceiver 122, etc.) and may preempt communication activities on the DDS subscription to respond to the LTE page.

The method 400 may be embodied on a non-transitory computer readable medium, for example, but not limited to, the memory 180 or other non-transitory computer readable medium known to those of skill in the art, having stored therein a program including computer executable instructions for making a processor, computer, or other programmable device execute the operations of the methods.

Further, one of ordinary skill in the art will appreciate that while the method has been described in terms of a DSDS mobile communication device, the method may be extended to a MSMS mobile communication device without departing from the scope of protection of the present disclosure.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for call setup for a voice-over-long-term evolution (VoLTE) call on multi-subscriber identity module (SIM) multi-standby (MSMS) mobile communication device, the method comprising:
    receiving a long-term evolution (LTE) page;
    determining whether a WiFi connection is available;
    in response to determining that the WiFi connection is not available, determining whether the LTE page was received on a non-dedicated data subscription (DDS) subscription; and
    in response to determining that the LTE page was received on the non-DDS subscription, granting a highest priority for communication activities to an LTE page response on the non-DDS subscription.

2. The method of claim 1, further comprising:
    in response to determining that the LTE page was not received on the non-DDS subscription, granting the highest priority for communication activities to the LTE page response on a DDS subscription.

3. The method of claim 2, wherein granting the highest priority for communication activities to the LTE page response on the non-DDS subscription comprises preempting activities on the DDS subscription and granting control of cellular transceiver resources to the non-DDS subscription, and
    wherein granting the highest priority for communication activities to the LTE page response on the DDS subscription comprises preempting activities on the non-DDS subscription and granting control of the cellular transceiver resources to the DDS subscription.

4. The method of claim 1, further comprising:
    in response to determining that the WiFi connection is available, determining whether voice-over WiFi (VoWiFi) is selected; and
    in response to determining that VoWiFi is selected, not granting priority for communication activities to the LTE page response.

5. The method of claim 4, further comprising:
    in response to determining that VoWiFi is not selected, determining whether WiFi is selected for packet-switched (PS) service; and in response to determining that WiFi is selected for PS service, granting the highest priority for communication activities to the LTE page response on a DDS subscription.

6. The method of claim 5, further comprising:
in response to determining that WiFi is not selected for PS service, determining whether the LTE page was received on the non-DDS subscription; and
in response to determining that the LTE page was received on the non-DDS subscription, granting the highest priority for communication activities to the LTE page response on the non-DDS subscription.

7. The method of claim 6, further comprising:
in response to determining that the LTE page was not received on the non-DDS subscription, granting the highest priority for communication activities to the LTE page response on the DDS subscription.

8. The method of claim 1, wherein the VoLTE call is a video telephony (VT) call.

9. A multi-subscriber identity module (SIM) multi-standby (MSMS) mobile communication device, comprising:
a cellular communication unit configured to communicate with one or more communication networks;
a WiFi communication unit configured to communicate with one or more WiFi networks;
a control unit operably connected to the cellular communication unit and the WiFi communication unit, the control unit configured to:
control the cellular communication unit to receive a long-term evolution (LTE) page;
control the WiFi communication unit to determine whether a WiFi connection is available;
in response to determining that the WiFi connection is not available, determine whether the LTE page was received on a non-dedicated data subscription (DDS) subscription; and
in response to determining that the LTE page was received on the non-DDS subscription, control the cellular communication unit to grant a highest priority for communication activities to an LTE page response on the non-DDS subscription.

10. The MSMS mobile communication device of claim 9, wherein the control unit is further configured to:
in response to determining that the LTE page was not received on the non-DDS subscription, control the cellular communication unit to grant the highest priority for communication activities to the LTE page response on a DDS subscription.

11. The MSMS mobile communication device of claim 10, wherein when granting the highest priority for communication activities to the LTE page response on the non-DDS subscription the control unit is further configured to control the cellular communication unit to preempt activities on the DDS subscription and grant control of cellular transceiver resources to the non-DDS subscription, and
wherein when granting the highest priority for communication activities to the LTE page response on the DDS subscription the control unit is further configured to control the cellular communication unit to preempt activities on the non-DDS subscription and grant control of the cellular transceiver resources to the DDS subscription.

12. The MSMS mobile communication device of claim 9, wherein the control unit is further configured to:

in response to determining that the WiFi connection is available, determine whether voice-over WiFi (VoWiFi) is selected; and
in response to determining that VoWiFi is selected, control the cellular communication unit to not grant priority for communication activities to the LTE page response.

13. The MSMS mobile communication device of claim 12, wherein the control unit is further configured to:
in response to determining that VoWiFi is not selected, determine whether WiFi is selected for packet-switched (PS) service; and
in response to determining that WiFi is selected for PS service, control the cellular communication unit to grant the highest priority for communication activities to the LTE page response on a DDS subscription.

14. The MSMS mobile communication device of claim 13, wherein the control unit is further configured to:
in response to determining that WiFi is not selected for PS service, determine whether the LTE page was received on the non-DDS subscription; and
in response to determining that the LTE page was received on the non-DDS subscription, control the cellular communication unit to grant the highest priority for communication activities to the LTE page response on the non-DDS subscription.

15. The MSMS mobile communication device of claim 14, wherein the control unit is further configured to:
in response to determining that the LTE page was not received on the non-DDS subscription, control the cellular communication unit to grant the highest priority for communication activities to the LTE page response on the DDS subscription.

16. The MSMS mobile communication device of claim 9, wherein the VoLTE call is a video telephony (VT) call.

17. A non-transitory computer readable medium having stored thereon instructions for causing one or more processors to perform a method for voice-over-long-term evolution (VoLTE) call setup on multi-subscriber identity module (SIM) multi-standby (MSMS) mobile communication device, the instructions comprising:
receiving a long-term evolution (LTE) page;
determining whether a WiFi connection is available;
in response to determining that the WiFi connection is not available, determining whether the LTE page was received on a non-dedicated data subscription (DDS) subscription; and
in response to determining that the LTE page was received on the non-DDS subscription, granting a highest priority for communication activities to an LTE page response on the non-DDS subscription.

18. The non-transitory computer readable medium having stored thereon instructions as defined in claim 17, the instructions further including:
in response to determining that the LTE page was not received on the non-DDS subscription, granting the highest priority for communication activities to the LTE page response on a DDS subscription.

19. The non-transitory computer readable medium having stored thereon instructions as defined in claim 17, the instructions further including:
in response to determining that the WiFi connection is available, determining whether voice-over WiFi (VoWiFi) is selected; and
in response to determining that VoWiFi is selected, not granting priority for communication activities to the LTE page response.

20. The non-transitory computer readable medium having stored thereon instructions as defined in claim 19, the instructions further including:
  in response to determining that VoWiFi is not selected, determining whether WiFi is selected for packet-switched (PS) service; and
  in response to determining that WiFi is selected for PS service, granting the highest priority for communication activities to the LTE page response on a DDS subscription.

21. The non-transitory computer readable medium having stored thereon instructions as defined in claim 20, the instructions further including:
  in response to determining that WiFi is not selected for PS service, determining whether the LTE page was received on the non-DDS subscription; and
  in response to determining that the LTE page was received on the non-DDS subscription, granting the highest priority for communication activities to the LTE page response on the non-DDS subscription.

22. The non-transitory computer readable medium having stored thereon instructions as defined in claim 21, the instructions further including:
  in response to determining that the LTE page was not received on the non-DDS subscription, granting the highest priority for communication activities to the LTE page response on the DDS subscription.

23. The non-transitory computer readable medium having stored thereon instructions as defined in claim 17, wherein the VoLTE call is a video telephony (VT) call.

24. A multi-subscriber identity module (SIM) multi-standby (MSMS) mobile communication device, comprising:
  means for receiving a long-term evolution (LTE) page;
  means for determining whether a WiFi connection is available;
  in response to determining that the WiFi connection is not available, means for determining whether the LTE page was received on a non-dedicated data subscription (DDS) subscription; and
  in response to determining that the LTE page was received on the non-DS subscription, means for granting a highest priority for communication activities to an LTE page response on the non-DDS subscription.

25. The MSMS mobile communication device of claim 24, further comprising:
  in response to determining that the LTE page was not received on the non-DDS subscription, means for granting the highest priority for communication activities to the LTE page response on a DDS subscription.

26. The MSMS mobile communication device of claim 24, further comprising:
  in response to determining that the WiFi connection is available, means for determining whether voice-over WiFi (VoWiFi) is selected; and
  in response to determining that VoWiFi is selected, means for not granting priority for communication activities to the LTE page response.

27. The MSMS mobile communication device of claim 26, further comprising:
  in response to determining that VoWiFi is not selected, means for determining whether WiFi is selected for packet-switched (PS) service; and
  in response to determining that WiFi is selected for PS service, means for granting the highest priority for communication activities to the LTE page response on a DDS subscription.

28. The MSMS mobile communication device of claim 27, further comprising:
  in response to determining that WiFi is not selected for PS service, means for determining whether the LTE page was received on the non-DDS subscription; and
  in response to determining that the LTE page was received on the non-DDS subscription, means for granting the highest priority for communication activities to the LTE page response on the non-DDS subscription.

29. The MSMS mobile communication device of claim 28, further comprising:
  in response to determining that the LTE page was not received on the non-DDS subscription, means for granting the highest priority for communication activities to the LTE page response on the DDS subscription.

30. The MSMS mobile communication device of claim 24, wherein the VoLTE call is a video telephony (VT) call.

* * * * *